(12) United States Patent
Xiao et al.

(10) Patent No.: US 9,806,484 B2
(45) Date of Patent: Oct. 31, 2017

(54) RADIAL POLARIZATION THIN-DISK LASER

(71) Applicants: HAN'S LASER TECHNOLOGY INDUSTRY GROUP CO., LTD., Shenzhen (CN); HAN'S CNC TECHNOLOGY CO., LTD., Shenzhen (CN)

(72) Inventors: Lei Xiao, Shenzhen (CN); Chengwan Gong, Shenzhen (CN); Jiantao Zhao, Shenzhen (CN); Jinbin Yang, Shenzhen (CN); Yanhua Ning, Shenzhen (CN); Yunfeng Gao, Shenzhen (CN)

(73) Assignees: HAN'S LASER TECHNOLOGY INDUSTRY GROUP CO., LTD., Shenzhan, Guangdong (CN); HAN'S CNC TECHNOLOGY CO., LTD., Shenzhan, Guangdong (CN)

( * ) Notice: Subject to any disclaimer, the term of this patent is extended or adjusted under 35 U.S.C. 154(b) by 0 days.

(21) Appl. No.: 15/034,130

(22) PCT Filed: Nov. 22, 2013

(86) PCT No.: PCT/CN2013/087680
§ 371 (c)(1),
(2) Date: May 3, 2016

(87) PCT Pub. No.: WO2015/074244
PCT Pub. Date: May 28, 2015

(65) Prior Publication Data
US 2016/0285225 A1 Sep. 29, 2016

(51) Int. Cl.
*H01S 3/06* (2006.01)
*H01S 3/16* (2006.01)
(Continued)

(52) U.S. Cl.
CPC ............ *H01S 3/0604* (2013.01); *G02B 5/001* (2013.01); *G02B 5/3066* (2013.01);
(Continued)

(58) Field of Classification Search
CPC . H01S 3/08054; H01S 2301/14; H01S 3/0604
See application file for complete search history.

(56) References Cited

U.S. PATENT DOCUMENTS 4,755,027 A 7/1988 Schafer
5,359,622 A 10/1994 Shih
(Continued)

FOREIGN PATENT DOCUMENTS

CN 1290415 A 4/2001
CN 101552425 A 10/2009
(Continued)

OTHER PUBLICATIONS

Newburgh et al., "Composite Yb:YAG/SiC-Prism Thin Disk Laser" 2010, Optics Express, vol. 18, No. 16, 17066-17074.*
(Continued)

*Primary Examiner* — Joshua King
(74) *Attorney, Agent, or Firm* — HoustonHogle LLP

(57) ABSTRACT

A radial polarization disk laser, including a pumping source, a collimator lens, a focusing lens, a laser gain medium, a Brewster axial cone, and a output lens, which are sequentially arranged along a laser light path. An angle formed between the conical surface and the bottom surface of said Brewster axial cone is a Brewster's angle. Said laser gain medium is bonded with said bottom surface; said laser gain medium and said output lens form a laser harmonic oscillator cavity therebetween. The pumped laser light emitted by said pumping source passes through said collimator lens and said focusing lens, then is focused on the laser gain medium, and. the generated photons oscillate in said laser harmonic (Continued)

oscillator cavity, and then a radial polarized laser beam is finally output by said output lens.

13 Claims, 19 Drawing Sheets

(51) Int. Cl.
    *G02B 5/00*     (2006.01)
    *G02B 5/30*     (2006.01)
    *H01S 3/081*     (2006.01)
    *H01S 3/0933*     (2006.01)
    *H01S 3/08*     (2006.01)
    *H01S 3/02*     (2006.01)
    *H01S 3/042*     (2006.01)

(52) U.S. Cl.
    CPC ............ *H01S 3/0615* (2013.01); *H01S 3/081* (2013.01); *H01S 3/0813* (2013.01); *H01S 3/08059* (2013.01); *H01S 3/1618* (2013.01); *H01S 3/1643* (2013.01); *H01S 3/025* (2013.01); *H01S 3/042* (2013.01); *H01S 3/0612* (2013.01); *H01S 3/0804* (2013.01); *H01S 3/08054* (2013.01); *H01S 3/0933* (2013.01); *H01S 2301/14* (2013.01); *H01S 2301/20* (2013.01)

(56) References Cited

U.S. PATENT DOCUMENTS

| 5,375,130 | A | 12/1994 | Shih |
| 6,115,400 | A | 9/2000 | Brown |
| 6,577,666 | B2* | 6/2003 | Erhard ............... H01S 3/09415 372/69 |
| 2006/0153257 | A1* | 7/2006 | Franjic .................. H01S 3/042 372/34 |
| 2008/0175292 | A1* | 7/2008 | Sheik-Bahae ........ H01S 3/0612 372/45.01 |
| 2010/0142049 | A1 | 6/2010 | Sawabe et al. |
| 2012/0250719 | A1* | 10/2012 | Hodgson .................. H01S 3/16 372/70 |

FOREIGN PATENT DOCUMENTS

| EP | 1744187 A1 | 1/2007 | |
| WO | WO 0109993 A1 * | 2/2001 | ......... H01S 3/08059 |

OTHER PUBLICATIONS

Li, Jian-Lang et al., "Generation of radially polarized mode in Yb fiber laser by using a dual conical prism," Optics Letters, vol. 31, Issue 20, pp. 2969-2971 (2006).

International Search Report and Written Opinion, dated Aug. 26, 2014, from International Application No. PCT/CN2013/087680, filed on Nov. 22, 2013. Thirteen pages.

International Search Report and Written Opinion of the International Searching Authority, dated May 26, 2014, from International Application No. PCT/CN2013/087687, filed on Nov. 22, 2013. Seventeen pages.

Zhong, Lan-Xiang et al., "Oscillating Mode with Radial Polarization in an Active Yb Fiber Based on a Brewster Dual Conical Prism," Acta Photonica Sinica, vol. 37, Issue 3, pp. 430-434 (2008). English translation of Abstract.

* cited by examiner

RADIAL POLARIZATION THIN-DISK LASER

RELATED APPLICATIONS

This application is a §371 National Phase Application of International Application No. PCT/CN2013/087680, filed on Nov. 22, 2013. This application is related to application Ser. No. 15/034,127, filed on Nov. 22, 2013, now U.S. Pat. No. 9,640,935, issued on May 2, 2017, entitled RADIALLY POLARIZED THIN DISK LASER, both of which are incorporated herein by reference in their entirety.

FIELD OF THE INVENTION

The present invention relates to a laser, and more particularly relates to a disk laser with gain medium to produce radially polarized laser.

BACKGROUND OF THE INVENTION

Disk laser is a kind of all solid-state laser, which has been developing rapidly since 1994 when Adolf Giesen et al. first invented the disk laser. Disk laser uses disk-like material as gain medium, i.e. disk gain medium, wherein the disk-like material is small in thickness and is relatively large in transverse dimension, in operation, disk laser needs to dissipate the heat of the disk gain medium. A traditional cooling system of disk gain medium includes copper heat sink, which is attached to the disk gain medium and has high thermal conductivity. Copper heat sink is provided with cooling medium micro channels. Because the area of the disk gain medium is very big and the thickness is very small, therefore the heat of the gain medium could be transferred to the cooling medium micro channels quickly and effectively, and then taken away by the cooling medium. Disk laser has some advantages, for example, disk laser can export the heat deposition in the gain medium efficiently, and reduce the thermal lens effect of the gain medium, and therefore, it is possible to achieve high power, high efficiency, and high beam quality laser output. As the disk laser has the above-mentioned advantages, thus it is widely used in national defense and military affairs, scientific research, industry manufacturing, and various areas.

However, when the disk laser is in operation, the heat loaded into the disk gain medium causes the temperature of the gain medium. into Gaussian distribution, i.e., the energy density in the center of the disk gain medium is relatively high, and the energy density gradually reduced from the center to the surrounding portion. As a result, the center portion of the disk gain medium has a relatively large outward expansion, and an upside-down bowl-like deformation is formed, and this is the heat lens effect of the disk laser. When disk laser is operated in high power, the heat lens effect of the disk gain medium will affect the laser output power, output stability and beam quality of the laser. If the expansion deformation of the disk gain medium exceeds the material's capability, it may even result in a disk gain medium burst.

SUMMARY OF THE INVENTION

Based on this, it is necessary to provide a radial polarization disk laser, which can improve the heat lens effect, and increase the output stability.

A radial polarization disk laser includes a pumping source, a collimator lens, a focusing lens, a laser gain medium, a Brewster axial cone, and a output lens, which are sequentially arranged along a laser light path, wherein an angle formed between a conical surface and a bottom surface of said Brewster axial cone is a Brewster's angle; said laser gain medium is bonded with said bottom surface; said laser gain medium and said output lens form a laser harmonic oscillator cavity therebetween; wherein a pumped laser light emitted by said pumping source passes through said collimator lens and said focusing lens, then is focused onto the laser gain medium, and the generated photons oscillate in said laser harmonic oscillator cavity, and then a radially polarized laser beam is finally output by said output lens.

In one embodiment, the laser gain medium is Yb:YAG disk with a doping concentration of 5.0 at % to 15 at %, and the Yb:YAG disk has a thickness of 0.2 to 0.5 mm.

In one embodiment, said Brewster axial cone includes a base and a cone attached to said base, said laser gain medium is bonded with said base, and a thickness of said base is twice of the thickness of said Yb:YAG disk.

In one embodiment, said Brewster axial cone is made of YAG crystal, and said Brewster's angle is 61.2134°±2'.

In one embodiment, said Brewster axial cone is made of quartz, and said Brewster's angle is 55.4°±2'.

In one embodiment, said radial polarization disk laser further comprises a concave reflector group, disposed at a side of the laser gain medium away from said Brewster axial cone; wherein the pumped laser not absorbed by the laser gain medium is reflected by said concave reflector group, and then reenters said laser gain medium.

In one embodiment, said concave reflector group comprises seven inner reflectors and eight outer reflectors, said seven inner reflectors and said focusing lens are arranged to form an inner ring, which is symmetrical in respect to an axis of said Brewster axial cone; and said eight outer reflectors are arranged to form an outer ring surrounding the inner ring.

In one embodiment, one surface of said laser gain medium away from the Brewster axial cone is provided with a first two-wavelength coating, which is highly transmissive in respect to incident light and highly reflective in respect to emergent light; and the other side of said gain medium close to the Brewster axial cone is provided with a second two-wavelength coating, which is highly reflective in respect to incident light and highly transmissive in respect to emergent light.

In one embodiment, the bottom surface and the conical surface of said Brewster axial cone are respectively provided with high-reflection coating in respect to emergent light.

In one embodiment, said radial polarization disk laser further comprises a lens holder, a pump head, and a first sealing cover; wherein said pump head and said first sealing cover cooperatively form a pumping chamber to accommodate said lens holder; said concave reflector group is fixed to said lens holder; and in the first sealing cover is provided with a coolant circulation system therein.

In one embodiment, said radial polarization disk laser further comprises a heat dissipating device, a second sealing cover, and an output lens barrel; wherein said second sealing cover and said output lens barrel cooperatively form an output lens chamber to accommodate said laser gain medium and said Brewster axial cone; said heat dissipating device is provided on a side of said second sealing cover, said output lens is provided on one end of said output lens barrel, on said output lens barrel is provided with a coolant circulation system.

In one embodiment, both on said heat dissipating device and on said second sealing cover are provided with taper holes pointing towards said laser gain medium.

In one embodiment, the pumped laser emitted by said pumping source has a wavelength of 940 nm.

In one embodiment, said radially polarized laser beam has a wavelength of 1030 nm.

In the above-described embodiments, the laser gain medium and Brewster axial cone are bonded with each other, such that the thermal lens effect of the disk can be improved, and a stable output of the radially polarized laser is achieved.

BRIEF DESCRIPTION OF THE DRAWINGS

The components in the drawings are not necessarily drawn to scale, the emphasis instead being placed upon clearly illustrating the principles of the present disclosure. Moreover, in the drawings, the same reference numerals designate corresponding parts throughout the views.

DETAILED DESCRIPTION OF THE EMBODIMENTS

Figure 1:
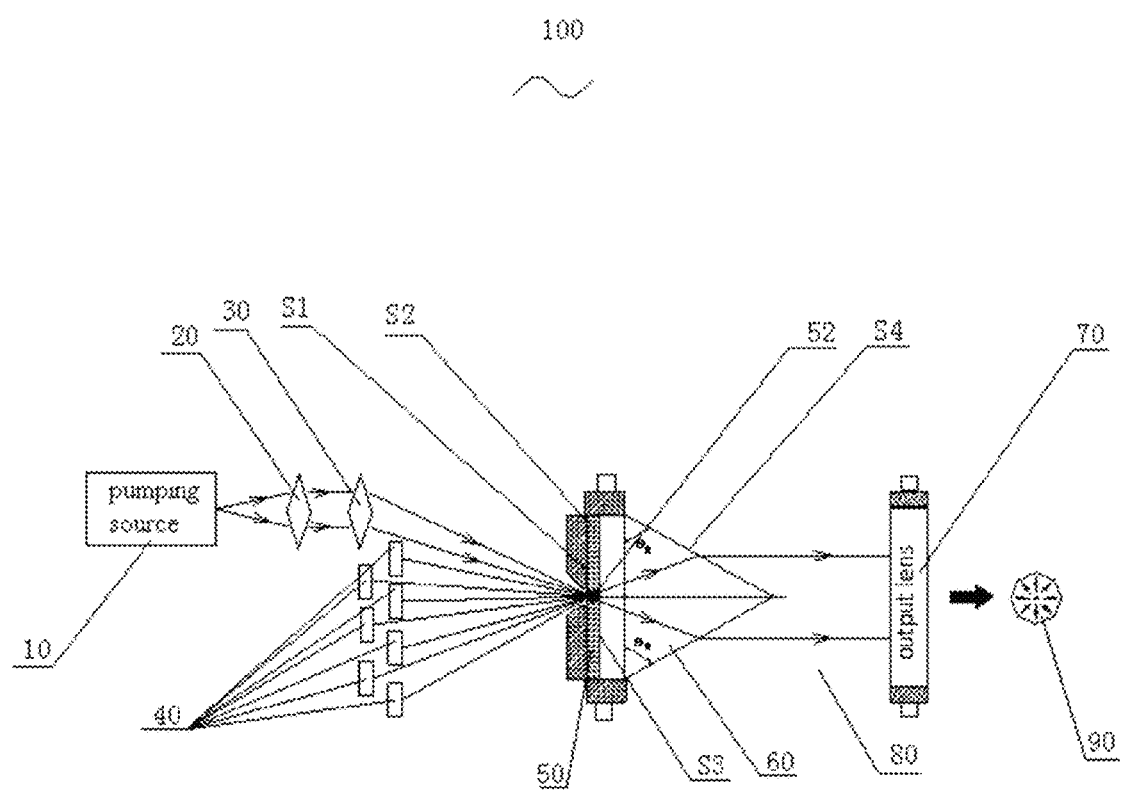
FIG. 1 is a schematic diagram of a radial polarization disk laser according to one embodiment.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined, in commonly used dictionaries, should be interpreted as having a meaning that is consistent with their meaning in the context of the relevant art and will not be interpreted in an idealized or overly formal sense unless expressly so defined herein.

Polarization is one of the most basic features of light; commonly known polarized light includes linearly polarized light, elliptically polarized light, circularly polarized light, and radially polarized light. Because the polarization direction of radially polarized light has a perfect symmetry geometric characteristic, it has a number of different characteristics compared with linearly polarized light, elliptically polarized light, and circularly polarized light. For example, radially polarized light has a symmetry electric field distribution along the optical axis and a hollow annular shaped light beam configuration; the radially polarized light focused by high. numerical lens can generate very small focal spot beyond the diffraction limit, which is much smaller than the focal spots of linearly polarized light, elliptically polarized light, and circularly polarized light, and the longitudinal electric field in the focus area is very strong; the radially polarized light only has transverse magnetic field and electrical field along the longitudinal axis; radially polarized light is polarized eigenstates, therefore when it travels in c-cut crystal, no crosstalk occurs. In recent years, these characteristics of radially polarized light have many applications. For example, in the guidance and capture of particles, particle acceleration, increasing the resolution of the microscope, metal cutting as well as increasing storage density, and the like; as people are having more in-depth knowledge of radially polarized light, it will have more and more applications in many areas.

Figure 2:
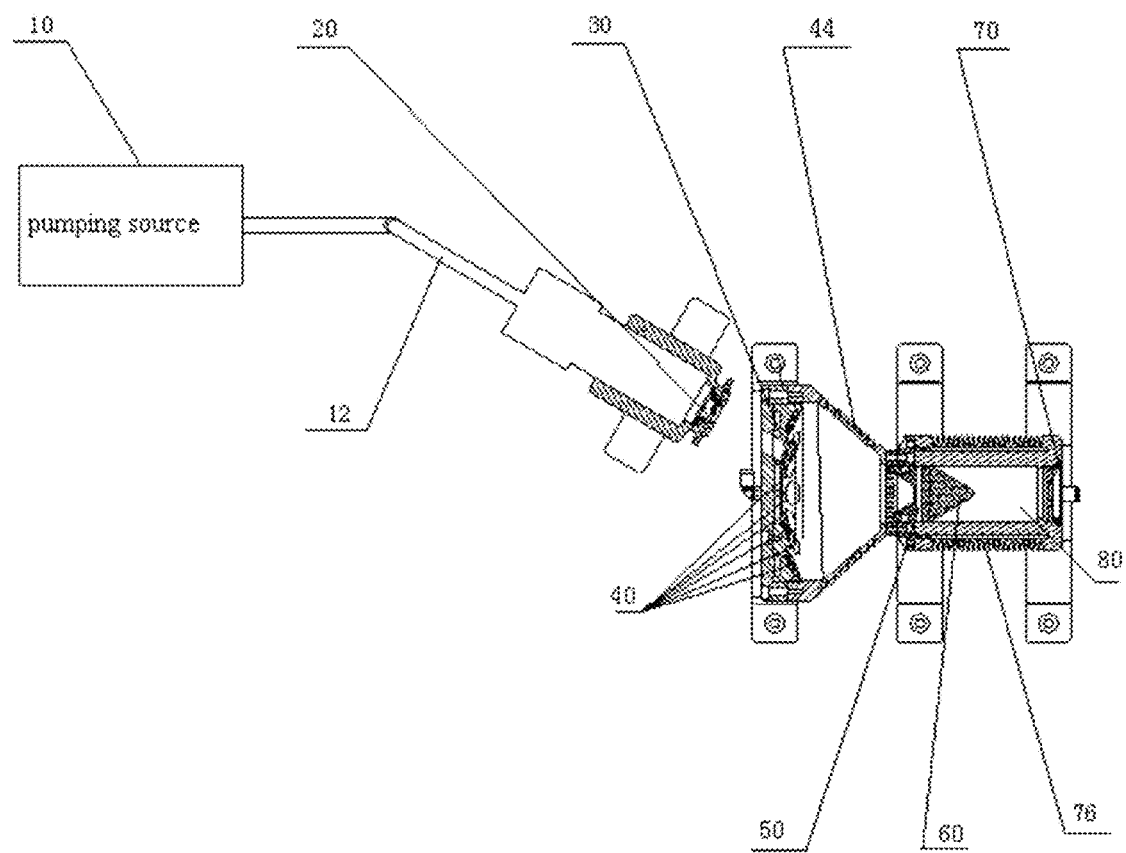
FIG. 2 is a cross-sectional view of a radial polarization disk laser according to one embodiment.
Figure 3:
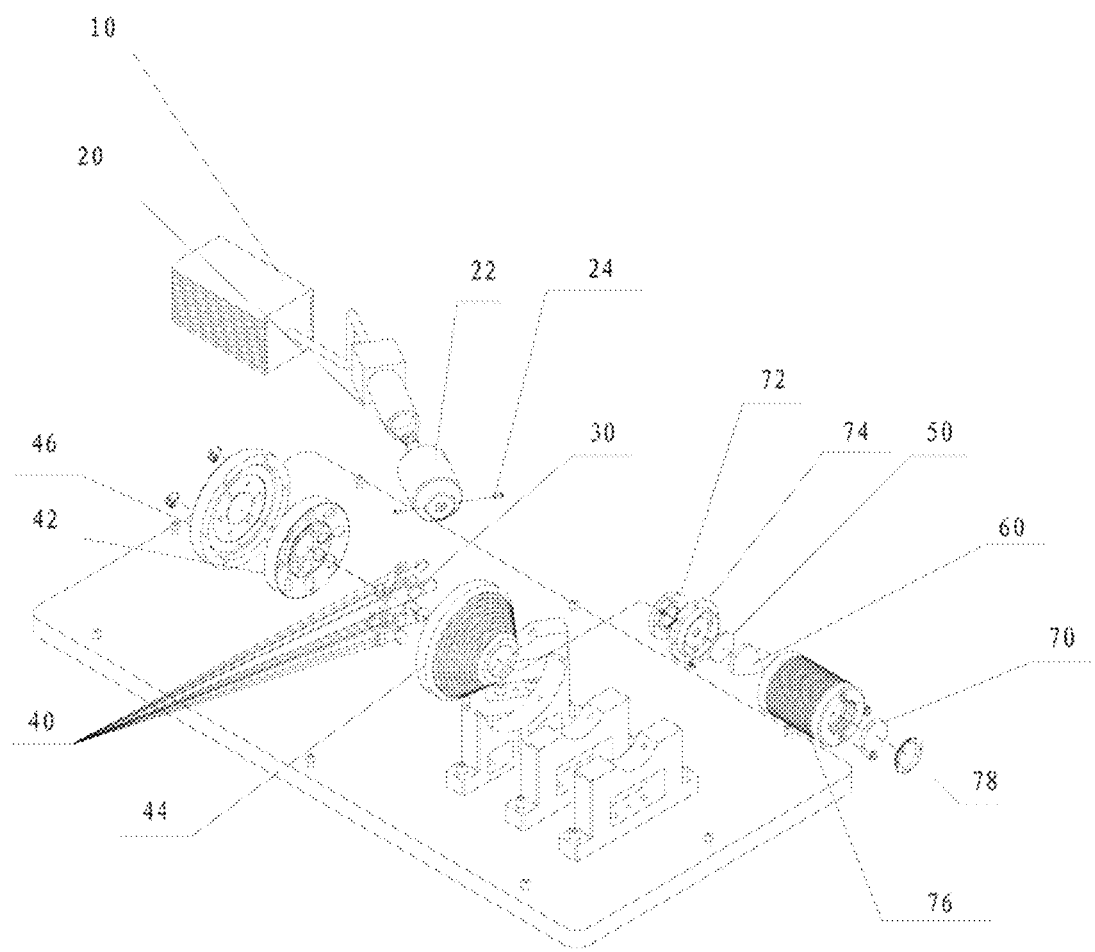
FIG. 3 is a perspective exploded view of the radial polarization disk laser as shown in FIG. 2.

Referring to FIG. 1, FIG. 2 and FIG. 3, according to one embodiment, the radial polarization disk laser 100 includes a pumping source 10, a collimator lens 20, a focusing lens 30, a laser gain medium 50, a Brewster axial cone 60, and an output lens 70, which are sequentially arranged along a laser light path. Laser beam output from the pumping source 10 are transmitted by optical fiber 12, and then pass through the collimator lens 20, the focusing lens 30, and the laser spot is focused onto the laser gain medium 50; the generated photons oscillate within the laser harmonic oscillator cavity 80, and pass through the Brewster axial cone 60 by multiple times, P-polarized photons of the polarized light are screened out, and then a radial polarized laser beam 90 is finally output by the output lens 70.

The pumping source 10 serves as a light source to produce the pumped laser. In the illustrated embodiment, a laser diode (LD) laser with a wavelength of 940 nm is used as the pumping source.

The collimator lens 20 is fixed in the collimator lens holder 22, which is provided with a cooling water connector 24.

Figure 4:
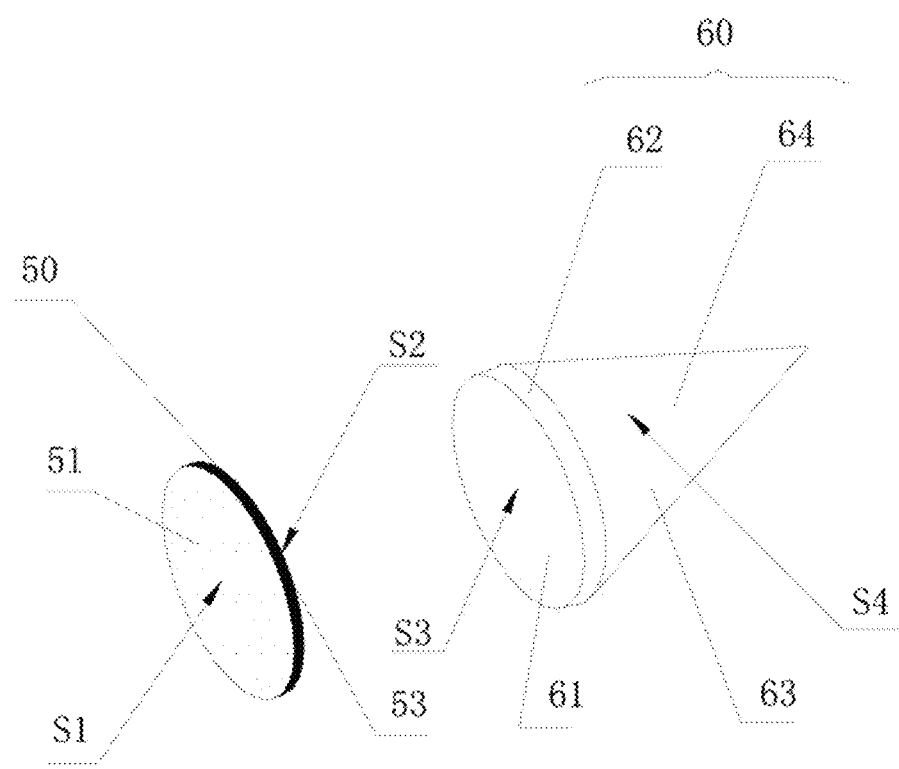
FIG. 4 is a perspective exploded view of the laser gain medium and Brewster axial cone as shown in FIG. 3.

Referring to FIG. 4, in this embodiment, the laser gain medium 50 is Yb:YAG ($Y^{3+}$:$Y_3Al_5O_{12}$) circular disk with a doping concentration of 5.0 at % and a thickness of 0.5 mm in other embodiments, the thickness of laser gain medium 50 can also be 0.2 to 0.5 mm, and the doping concentration can be 5.0 at % to 15 at %. $Yb^{3+}$ ions have two major absorption peaks, which are located at 938 nm and 970 nm. At 938 nm, with the absorption bandwidth up to 18 nm, it can be used as the pumping bandwidth of the laser diode (LD) pump. The strong fluorescence peaks is at 1030 nm wavelength where the absorption of pumping energy is weak, and it is the wavelength of the laser output normally.

In the illustrated embodiment, the Brewster axial cone 60 is made of YAG crystal. The Brewster axial cone includes a base 62 and a taper 64 connected to the base 62. The base 62 is shaped substantially as a circular disk, and it is bonded with the laser gain medium 50. In order to facilitate clamping the crystal during the bonding, the thickness of the base 62 is twice of the thickness of laser gain medium 50, e.g. 1 mm. In alternative embodiments, the thickness of the base 62 can be 1 to 2 mm. It should be understood that that, if other means are adopted to combine the Brewster axial cone 60 with the laser gain medium 50, the base 62 can be omitted. In this embodiment, the vertebral body 64 is a cone. YAG crystal have an index of refraction of 1.82 for 1030 nm photons, the angle formed between the conical surface and the bottom surface of the vertebral body 64 is a Brewster's angle, i.e. $\theta_B$=61.2134°. In this embodiment, the Brewster axial cone 60 is also made of quartz, then said Brewster's angle is 55.4°.

In this embodiment, surface S1 of the laser gain medium 50 away from the Brewster axial cone 60 is provided with a first two-wavelength coating 51 by coating, which is highly transmissive in respect to incident light and highly reflective in respect to emergent light. Specifically, the first two-wavelength coating is highly transmissive at 940 nm laser and highly reflective at 1030 nm laser at an angle of incidence $\theta_i$=32.4268°. The purpose of being highly transmissive at 940 nm laser is to allow the 940 nm pumped light be transmitted through surface S1, so as to effectively pump the laser gain medium 50. Yb:YAG laser crystal and YAG crystal have the same index of refraction for 1030 nm photons, i.e. 1.82, therefore, the pumped laser travels in straight lines between the Brewster incident point and the point of total reflection from the surface S1 of the laser gain medium 50. Pumping area (or pumped laser focal spot) 52 will excite photons with 1030 nm wavelength in each direction, and when photons are incident on surface S4 at Brewster's angle, i.e. $\theta_B$=61.2134°, light will be incident on surface S1 at an angle of incidence of $\theta_i$=32.4268°, therefore it is necessary to coat a coating 51 which is highly reflectively at 1030 nm at an angle of incidence of $\theta_i$=32.4268° on surface S1, in order to allow the 1030 nm photons excited from pumped light by laser gain medium 50 oscillate back and forth between surface S1 of the laser gain medium 50 and the output lens 70.

Surface S2 of the laser gain medium 50 close to the Brewster axial cone 60 is provided with a second two-wavelength coating 53 by coating, which is highly reflective at 940 nm and highly transmissive at 1030 nm. The purpose of being highly reflective at 940 nm laser is to allow the 940 nm pumped light, whose energy has not been absorbed by laser gain medium 50, be totally reflected from surface S2, and then the pumped light pass through the laser gain medium 50 again, so as to increase the absorption rate of laser gain medium 50 of 940 nm pumped energy. Surface S1 and surface S2 of the laser gain medium 50 are parallel, as photons with 1030 nm wavelength are wanted to pass surface S2 to reach surface S1, therefore surface S2 is coated by a coating highly transmissive at 1030 nm at an angle of incidence $\theta_i$=32.4268° so that 1030 nm photons in the laser harmonic oscillator cavity formed between surface S1 of the laser gain medium 50 and output lens 70 could be gained and amplified by the Yb:NAG laser pumping area 52 between surface S1 and surface S2.

A coating 61 is coated onto bottom surface S3 of the base 62 of the 61 Brewster axial cone 60, which is highly transmissive at 1030 nm at an angle of incidence $\theta_i$=32.4268°, in order to allow the oscillating photons pass this surface with almost no loss.

A coating 63 is coated onto conical surface S4 of the vertebral body 64 of the Brewster axial cone 60, which is highly transmissive at 1030 nm at an angle of incidence equal to Brewster's angle.

Figure 5:
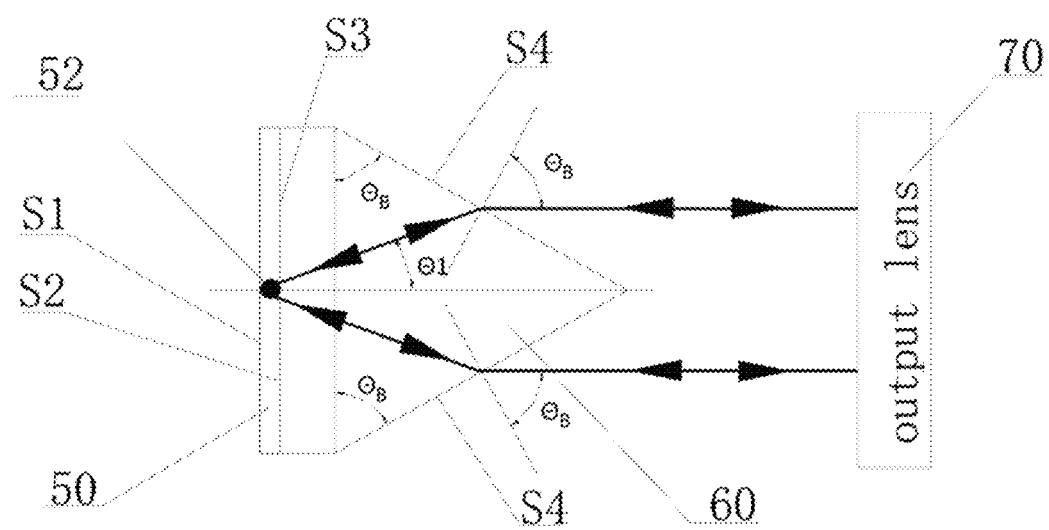
FIG. 5 illustrates a schematic propagation path of photons inside and outside of the Brewster axial cone and the laser gain medium.

FIG. 5 shows the schematic diagram of the propagation path of laser photons inside and outside of the Brewster axial cone 60 and the laser gain medium 50. The pumped laser of 940 nm emitted by pumping source 10 passes through the collimator lens 20 and the focusing lens 30, and then focal spot is focused on surface S1 of the laser gain medium 50; the energy of the pumped light of 940 nm, which has not been totally absorbed, is reflected by the surface S2, and then pass through the laser gain medium 50 again, so as to increase the absorption rate. The pumped laser gain medium 50 will excite photons with 1030 nm wavelength in each direction, but only photons at an angle of incidence of $\theta_i$=32.4268° can successively pass the laser gain medium 50 and the Brewster axial cone 60, and parallel emitted from conical surface S4 of the laser gain medium 50 at Brewster's angle; and the parallel emitted photons with 1030 nm wavelength are reflected by the flat laser output lens, and return along the same path, and then the returned photons are incident from air to the Brewster axial cone 60 at Brewster's angle. Because the Yb:YAG has a same index of incidence as that of YAG, photons are refracted to pass through the Brewster axial cone 60, and then transmit to pass through surface S3 and surface S2 in sequence along lines, and then are incident on the pumping area 52 of laser gain medium 50 at an angle of $\theta_i$=32.4268°, and the number of photons is increased. Because surface S1 is coated with coating highly reflective at 1030 nm laser at an angle of incidence $\theta_i$=32.4268°, photons are reflected from surface S1 again and enter the pumping area 52 of laser gain medium 50, and the number of photons is further increased. And then, photons enter surface S2, surface S3 and surface S4 in sequence along lines at an angle of $\theta_i$=32.4268°, and then is parallel emitted at Brewster's angle from surface S4, and the parallel emitted photons with 1030 nm wavelength are reflected by the laser flat output lens 70, and return along the same path, and the photons oscillate back and forth between surface S1 of the laser gain medium 50 and the output lens 70, in each time of the oscillation, photons will pass pumping area 52, and the number of photons is increased, and when the gain of photons with 1030 nm wavelength is more than the loss in the cavity, laser is emitted.

The principle of pumping of this laser will be described below.

Figure 6:
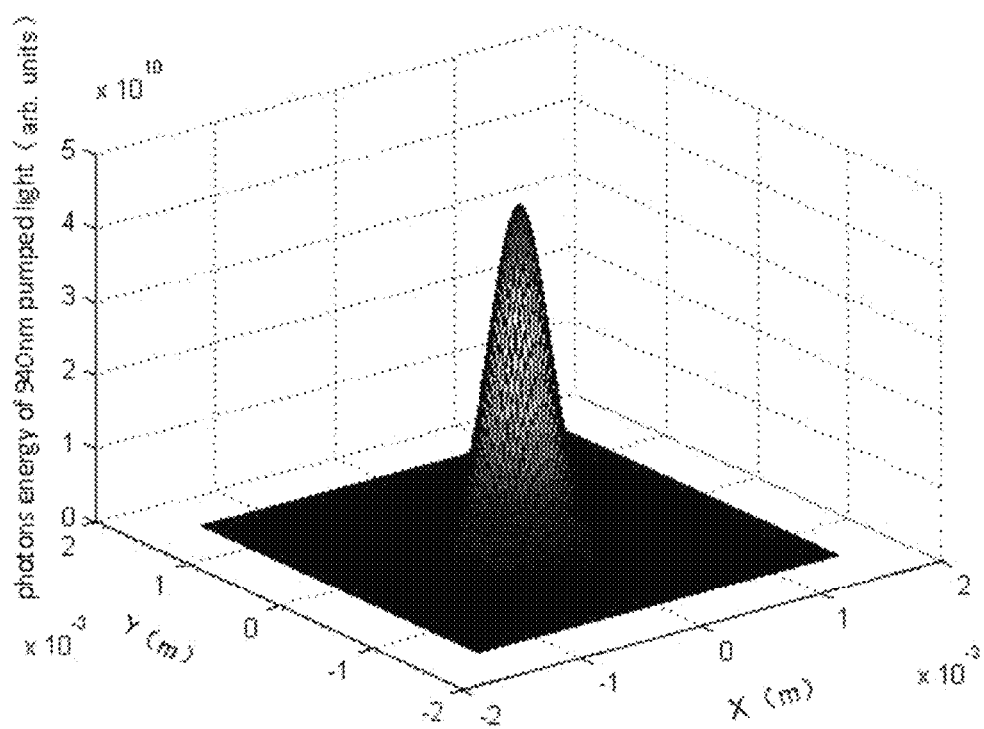
FIG. 6 is a Gaussian distribution model of pumped photons' energy by 940 nm pumping source.

The laser gain medium 50 used by the laser is a Yb:YAG disk with a thickness of 0.5 mm, and a doping concentration of 5.0 at %, and an LD laser with a wavelength of 940 nm is used as the pumping source. The energy distribution of 940 nm pumped light is shown in FIG. 6, and the pumped light's energy distribution of photons follows a Gaussian distribution model.

When using 940 nm laser to pump laser gain medium 50, Yb:YAG laser crystal as the gain medium will absorb the pumping energy, the absorption function is $\eta_a = 1-\exp(\alpha*l)$, wherein α is absorption coefficient, and l is the thickness of Yb:YAG disk or the length of the Yb:YAG rod. For Yb:YAG disk with a doping concentration of 5.0 at %, the absorption coefficient α is 5.6 $cm^{-1}$.

Figure 7:
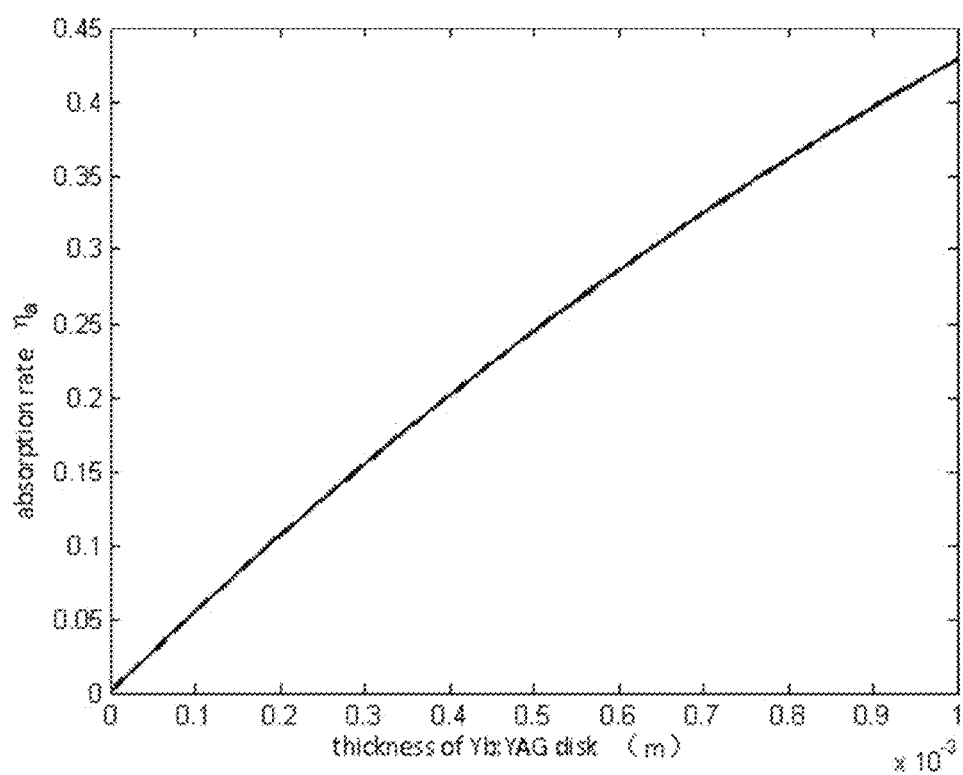
FIG. 7 shows the pumped photons' energy distribution of 940 nm pumped light by single-end pumped Yb:YAG rod-like crystal with 10 nm length.
Figure 8:
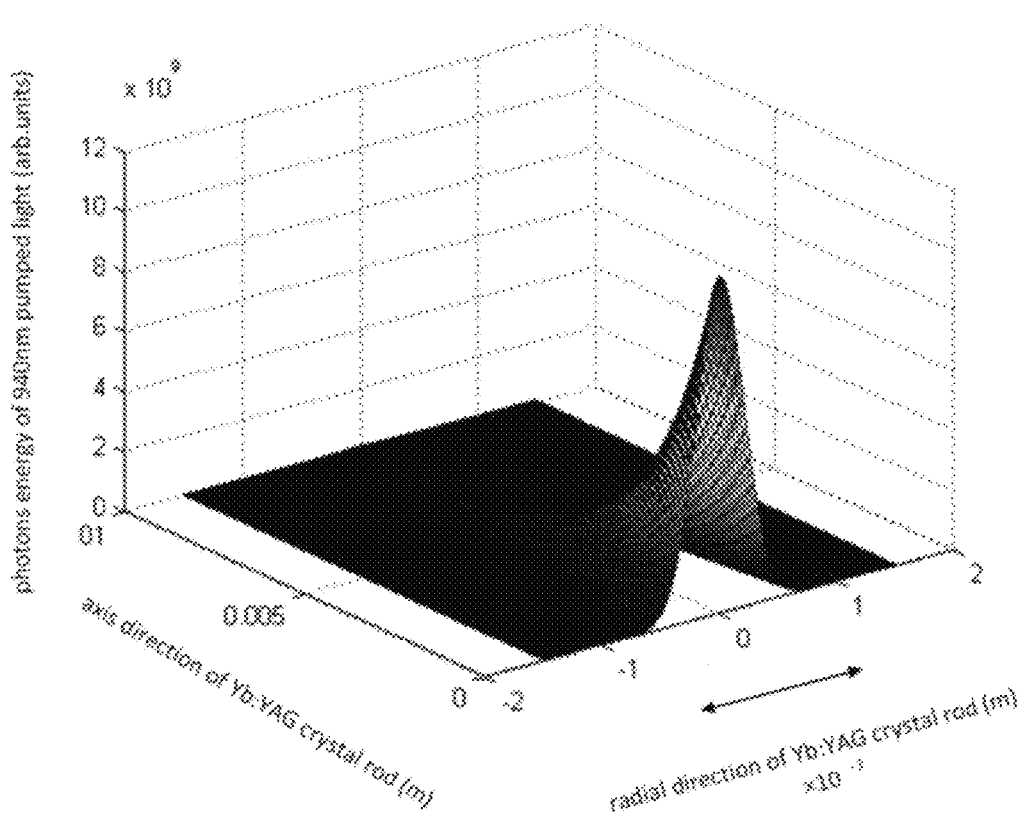
FIG. 8 shows the absorption of 940 nm pumped light by Yb:YAG rod-like crystal with a length of 10 mm.

FIG. 7 shows the pumped photons' energy distribution of 940 nm laser with 10 mm long Yb:YAG rod-like crystal, and the corresponding absorption function with the length of Yb:YAG rod-like crystal is shown as FIG. 8. It can be seen from FIG. 7 and FIG. 8 that, at 10 mm along the axial direction of the Yb:YAG crystal rod, 940 nm photons are almost zero, which means that by using 940 nm wavelength laser single-end pumped Yb:YAG crystal rod with 10 nm length, the crystal rod can absorb the pumping energy totally, and reach the maximum of laser output power when using the laser with this laser crystal.

Figure 9:
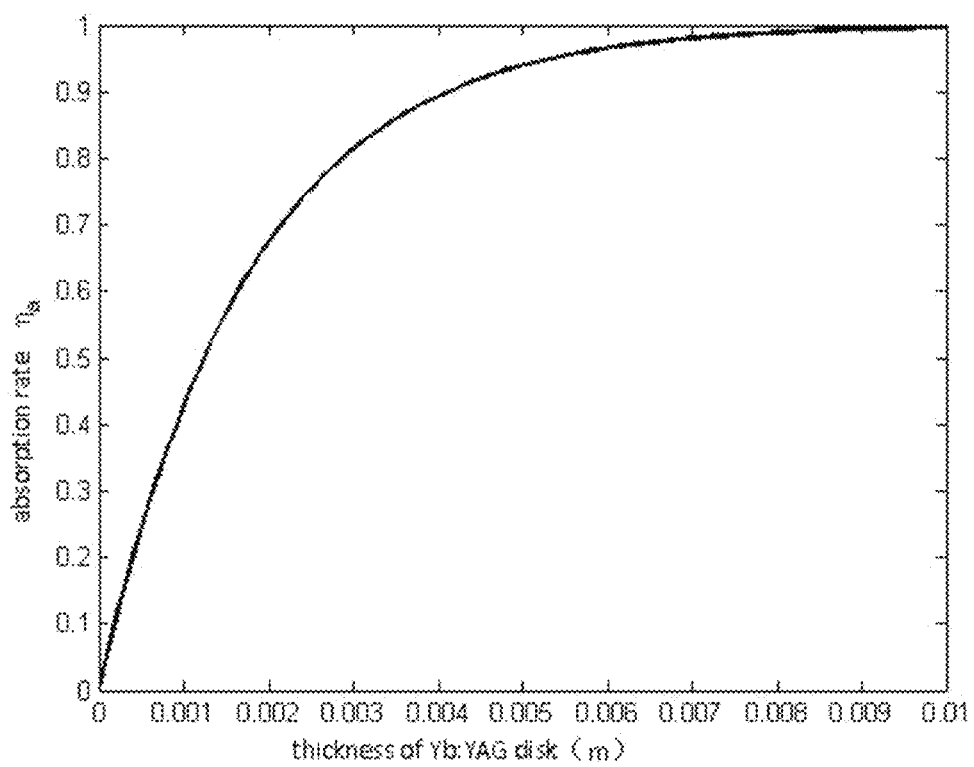
FIG. 9 shows the pumped photons energy distribution of 940 nm pumped light by single-end pumped Yb:YAG disk with a thickness of 0.5 mm.
Figure 10:
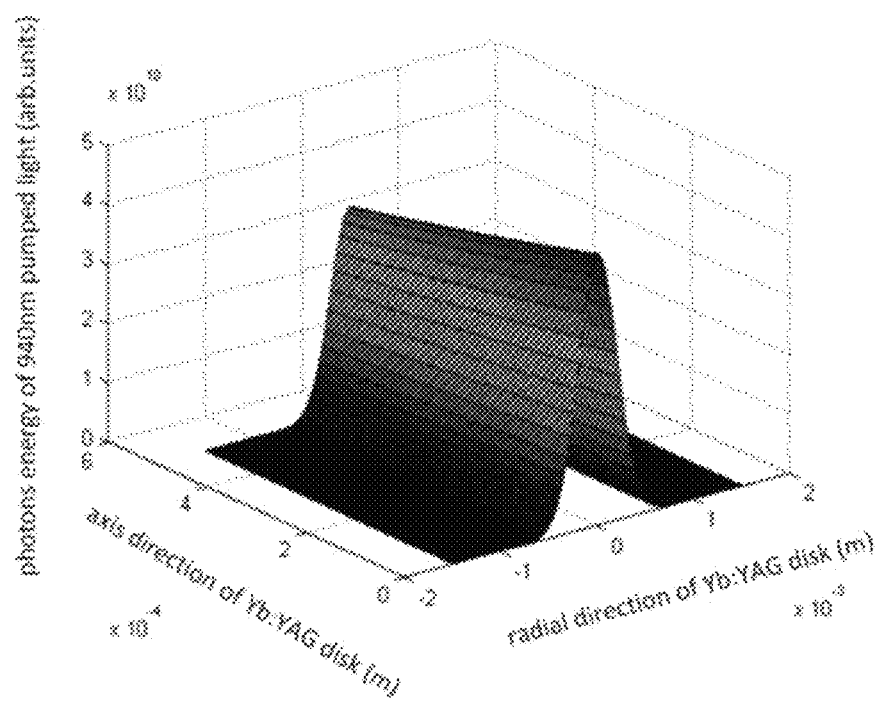
FIG. 10 shows the absorption of 940 nm pumped light by Yb:YAG disk crystal.

FIG. 9 shows the pumped photons' energy distribution of 9.40 nm pumped light by single-end pumped Yb:YAG thin disk with a thickness of 0.5 mm, and the corresponding absorption function of pumped laser with the thickness of Yb:YAG thin disk is shown as FIG. 10. It can be seen from FIG. 9 and FIG. 10 that, when using 940 nm laser and Yb:YAG thin disk with a thickness of 0.5 mm, according to the absorption function $\eta_a = 1-\exp(\alpha*l)$, wherein α is absorption coefficient, l is the thickness of Yb:YAG thin disk, the absorbed pumped energy by single-pumped disk is $\eta_a = 1-\exp(\alpha*1) = 1-\exp(-0.56*0.5) = 24.42\%$, and 75.58% of the pumped energy is not absorbed. It can be seen from the 940 nm photons' distribution by single-end pumping that apparently most of the pumped photons are not absorbed. It can be seen from FIG. 10 that the thickness of Yb:YAG disk will affect its absorption of the pump light; and the absorption is 24.42% for 940 nm laser with Yb:YAG disk having a thickness of 0.5 mm and a doping concentration of 5.0 at %, and absorption is 42.88% for 940 nm laser with Yb:YAG disk having a thickness of 1 mm and a doping concentration of 5.0 at %.

According to the pumping way of conventional disk laser, i.e. the pumped light not absorbed by single pumped thin disk will be reflected by a total reflection mirror provided on the other side, and pass the pumping disk gain medium again; for the Yb:YAG thin disk with a thickness of 0.5 mm, effective pumping length is twice of the thickness of the thin disk, i.e. 1 mm, and the absorption of pumped light is 42.88%, and more than half (57.12%) of the pumping energy is not absorbed, In order to improve the laser output power of the radial polarization laser, it is necessary to improve the energy absorption of the pumping laser.

Figure 11:
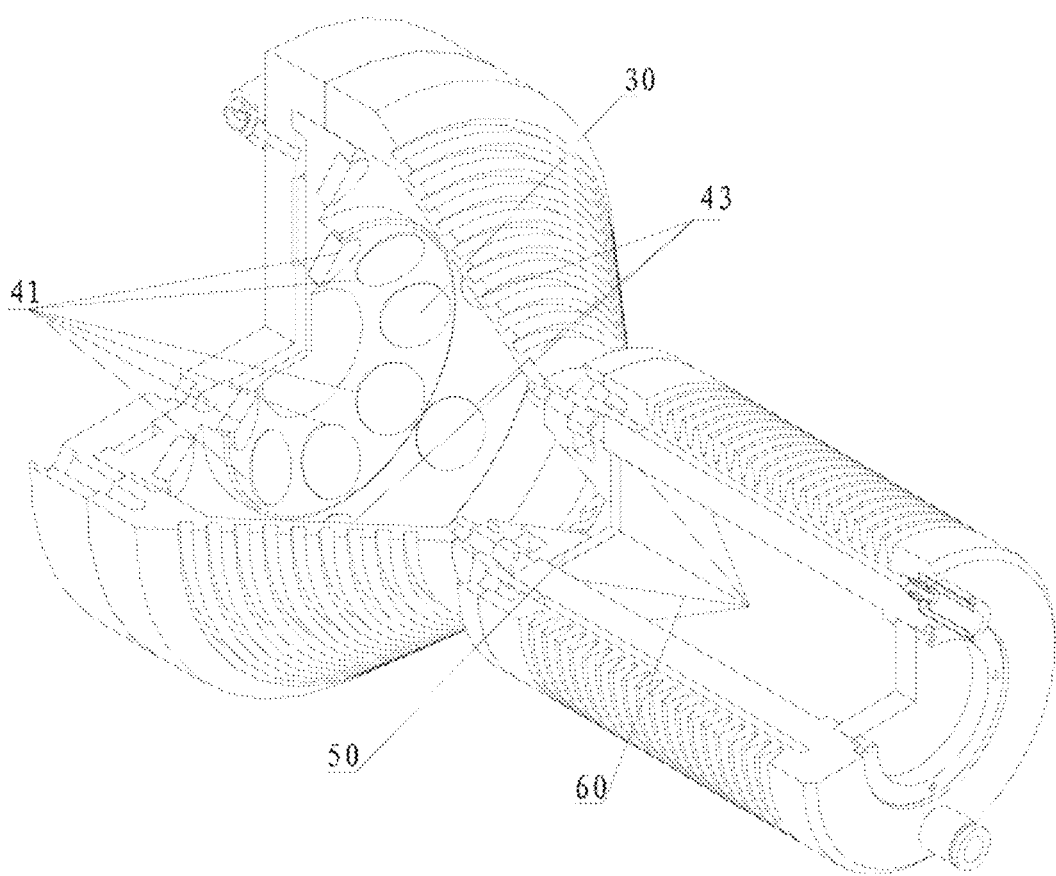
FIG. 11 is a partial perspective cross-sectional view of the concave reflector group and the pump head.

In order to improve the absorption, in the illustrated embodiment, at the pumping side of the laser gain medium 50 (the side away from the Brewster axial cone 60), a concave reflector group 40 with fifteen concave reflectors is disposed, and the fifteen concave reflectors are coated with high-reflection coating at 940 nm. Referring to FIG. 11, the concave reflector group 40 includes seven inner reflectors 41 and eight outer reflectors 43. The seven inner reflectors 41 and the focusing lens 30 are arranged to form an inner ring, which is symmetrical in respect to an axis of said Brewster axial cone 60. The eight outer reflectors 43 mirrors are arranged to form an outer ring surrounding the inner ring. Through laser pumping source 10 and focusing lens 30, focal point is focused on laser gain medium 50, and the unabsorbed pumped light is totally reflected from surface S2 of laser gain medium 50 into the air, and then is reflected back to laser gain medium 50 by the fifteen concave reflectors of the concave reflector group in sequence; and by using this pumping structure (one focusing lens+fifteen concave reflectors), the pumped light will have 31 times (=15*2+1) of pumping 0.5 mm thick thin disk, so that the effective pumping length is around 31*0.5=15.5 mm, and the pumping light absorption is $\eta_a = 1-\exp(-\alpha*l) = 1-\exp(-0.56*15.5) = 99.98\%$, which means that pumping light is almost absorbed in total by 5.0 at % Yb:YAG thin disk, and the absorption of the pumped light by laser gain medium is dramatically increased, so as to maximize the output power of radially polarized laser beam. It can be understood that the concave reflector group 40 can be omitted.

Figure 12:
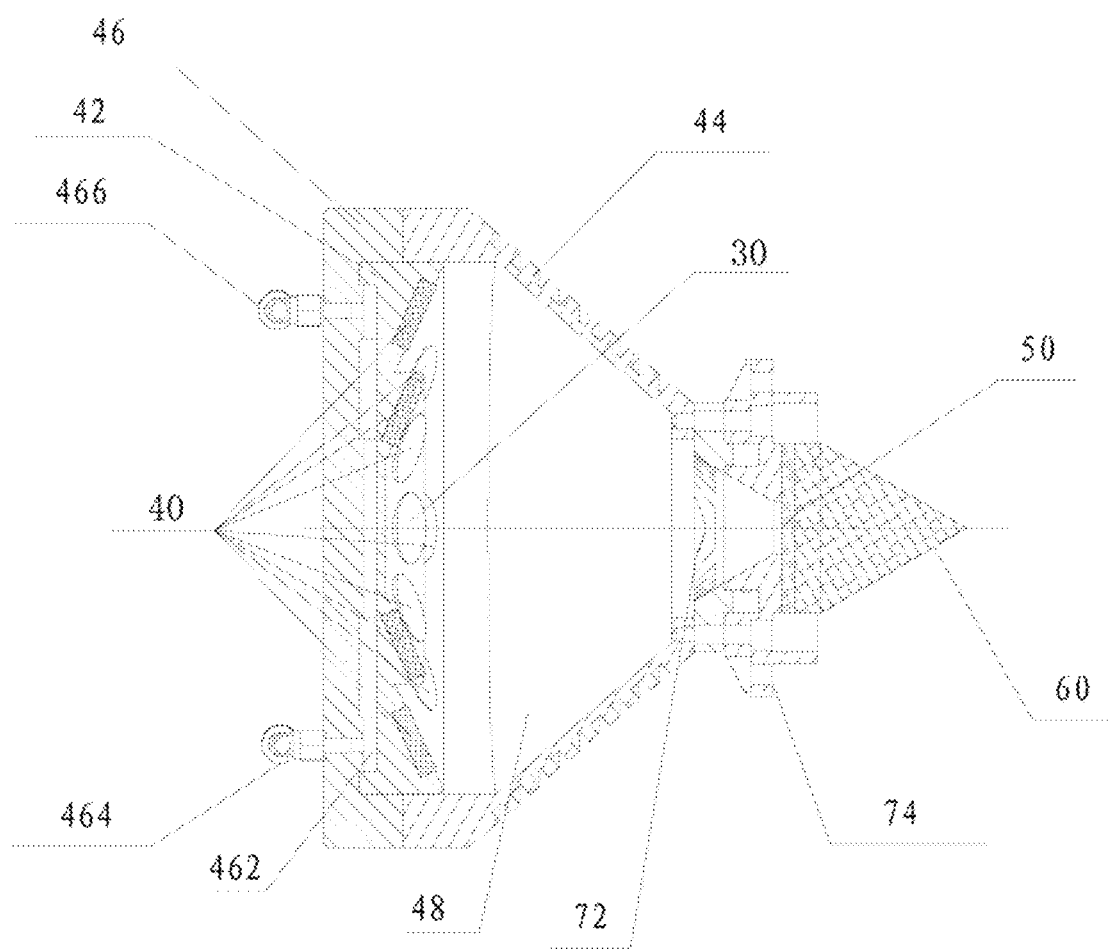
FIG. 12 is a cross-sectional view of the concave reflector group and the pump head.
Figure 13:
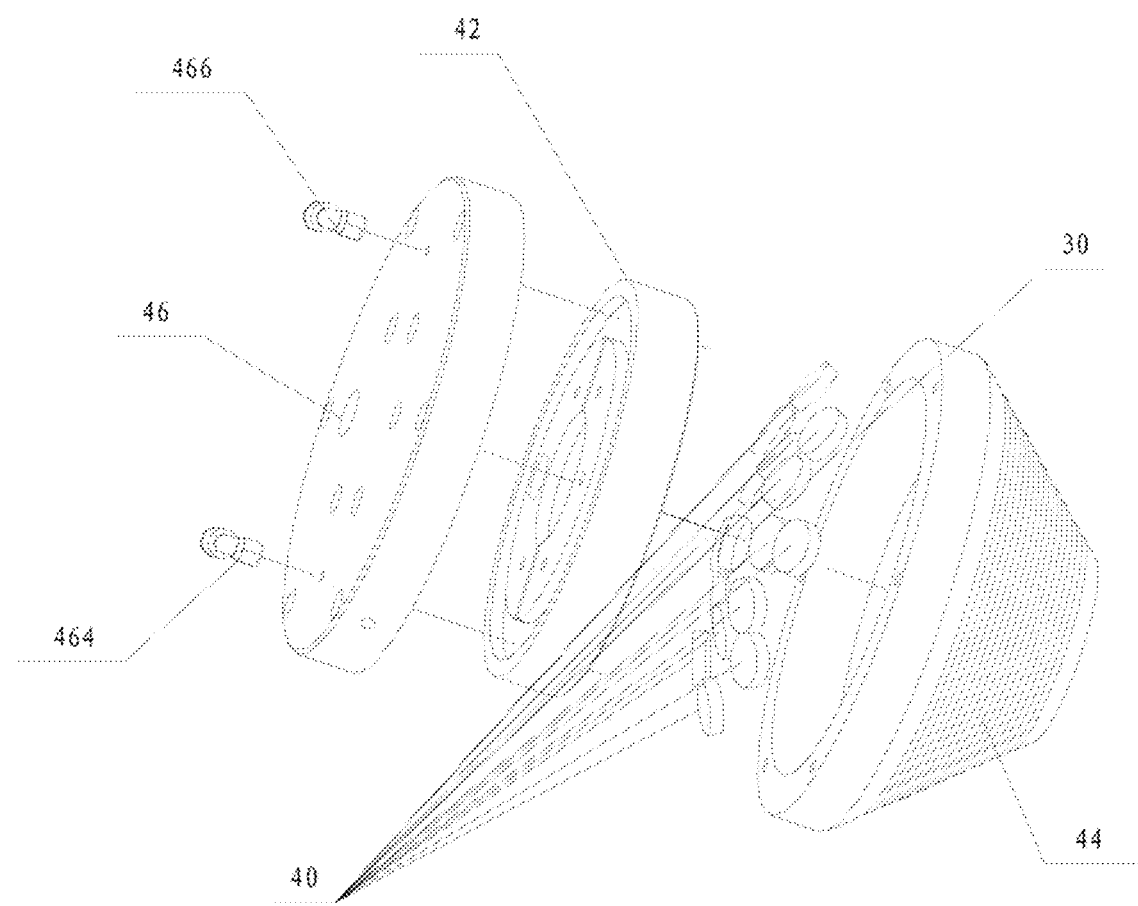
FIG. 13 is a perspective exploded view of the concave reflector group and the pump head.

In order to prevent the damage of optical lens by high energy pump, it is necessary to dissipate the heat of the concave reflector group 40. Referring to FIG. 12 and FIG. 13, according to this embodiment, the radial polarization disk laser 100 further includes a lens holder 42, a pump head 44, and a first sealing cover 46. The first sealing cover 46 is shaped substantially as a disk, and the pump head 44 is a hollow cone substantially matching with the first sealing cover 46. The pump head 44 and the first sealing cover 46 cooperatively form a pumping chamber 48 to accommodate the lens holder 42. The lens holder 42 is substantially a two-layer disk, and the concave reflector group 40 is fixed to the lens holder 42. Specifically, the seven inner reflectors 41 and the focusing lens 30 are arranged at the inner cycle of the lens holder 42, and eight outer reflectors 43 are arranged at the outer cycle of the lens holder 42. A channel 462 for cooling water circulation is formed between the first sealing cover 46 and the lens holder 42. The first sealing cover 46 is further provided with an inlet connector 464 and an outlet connector 466 which are connected to channel 462, so as to form a coolant circulation system.

The generation of polarized light will be further described below.

Figure 14:
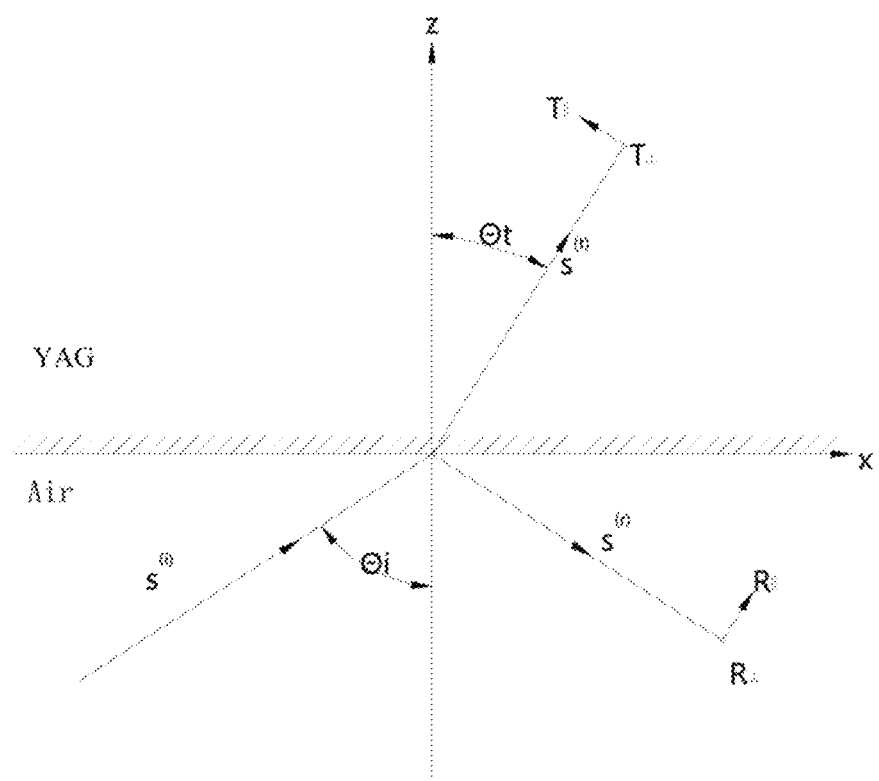
FIG. 14 is a schematic diagram of the refraction and the reflection of plane wave incident to the air and the YAG medium.

It is well known that light is a type of an electromagnetic wave. Referring to FIG. 14, and as a plane wave; light has reflection and refraction phenomenon when incident on the interface between air and YAG medium. As shown in FIG. 14, $S^{(i)}$ is incident light, $S^{(r)}$ is reflected light, and $S^{(t)}$ is transmitted light. The Brewster axial cone 60 is made of YAG crystal, and the index of refraction is 1.82 to photons with 1030 nm wavelength. According to Fresnel equations, when light enters YAG or Nd:YAG medium from air and is refracted and reflected, the equations to calculate transmission rate and reflectivity rate are as follows:

$$R_{//} = \frac{\tan^2(\theta_i - \theta_t)}{\tan^2(\theta_i + \theta_t)} \quad (1)$$

$$R_{\perp} = \frac{\sin^2(\theta_i - \theta_t)}{\sin^2(\theta_i + \theta_t)} \quad (2)$$

$$R_{//} + T_{//} = 1 \quad (3)$$

$$R_{\perp} + T_{\perp} = 1 \quad (4)$$

Wherein, $T_{81}$ is the parallel component of transmission rate, and $T_{195}$ is the vertical component of transmission rate, $R_{81}$ is the parallel component of reflectivity rate, $R_\perp$ is the vertical component of reflectivity rate, $\theta_i$ is the angle of incidence when light is incident on axial cone surface, $\theta_t$ is the angle of refraction when light is incident on axial cone surface.

Figure 15:
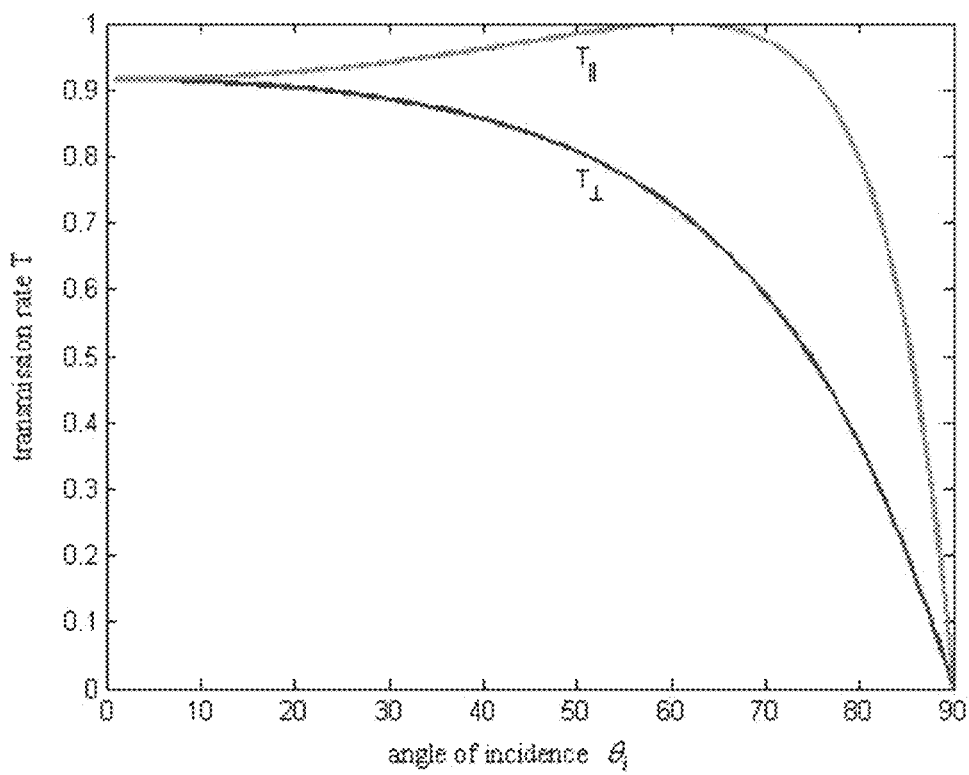
FIG. 15 shows the curve of reflectivity rate changing with incident angle $\theta_i$ when the light entering the YAG medium from the air.
Figure 16:
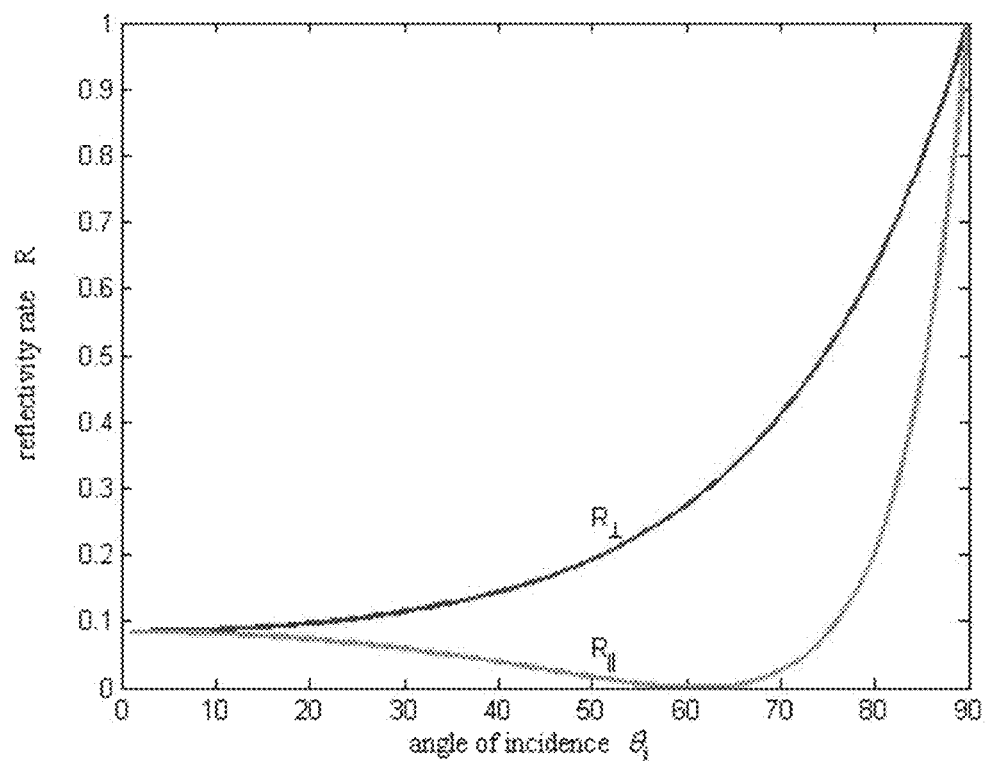
FIG. 16 shows the curve of transmission rate changing with incident angle $\theta_i$ when the light entering the YAG medium from the air.

According to the above described equations, when $\theta_i=61.2134°$, the parallel component of reflectivity rate $R_\parallel=0$, and the parallel component of transmission rate $T_{81}=1$, the reflection light only has vertical component and has no parallel component, and $\theta_i=61.2134°$ is a Brewster's angle. FIG. 15 and FIG. 16 respectively show the curve of reflectivity rate and the curve of transmission rate changing with incident angle $\theta_i$ when the light entering the YAG medium from the air. When light is incident on Brewster axial cone 60 from the air at Brewster's angle $\theta_B$, photons will have reflection and refraction phenomenon on the conical surface of the Brewster axial cone 60, and the reflection light only has vertical component S photons, and a portion of vertical component S photons and parallel component P photons are transmitted from air into Brewster axial cone 60.

Figure 17:
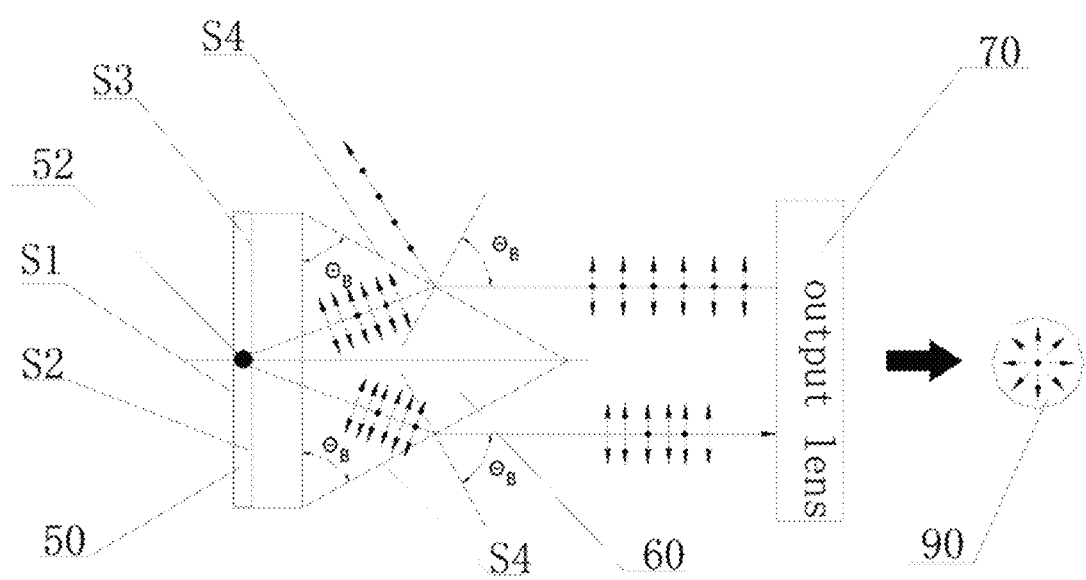
FIG. 17 is a schematic diagram of the light harmonic oscillator cavity of the radial polarization disk laser.

FIG. 17 shows the schematic diagram of the light harmonic oscillator cavity of the radial polarization disk laser, wherein "•" represents vertical component photons, i.e. S-polarized light, "↕" represents parallel component photons, i.e. P-polarized light. 940 nm light from pumping source passes focusing lens 30, and focal point is on focused on laser gain medium 50; and a Fabry-Perot resonator is formed between the laser gain medium 50 and the output lens 70, and the laser gain medium 50 is excited by pumping and emitting photons with 1030 nm wavelength centered on the pumping area (focal spot of pumped light) 52. As shown in FIG. 5, only the photons along the propagation path inside and outside of the Brewster axial cone and the laser gain medium, can oscillate back and forth in the laser harmonic oscillator cavity 80. All photons along other propagation path are restrained because they are lack of conditions to oscillate back and forth in the cavity.

In the above-mentioned radial polarization disk laser, the oscillation direction of photons with 1030 nm wavelength entering the laser harmonic oscillator cavity 80 can be deemed as synthesized by two vectors of vertical component the (S-polarized photons) and parallel component (P-polarized photons); and the photons with vertical component and photons with parallel component are reflected by output lens 70, and return along the same path, and are incident from air on conical surface S4 of Brewster axial cone 60 at Brewster's angle $\theta_B=61.2134°$; calculated according to the equations (1), (2), (3), and (4), the reflection rate of vertical component is 28.75%, the transmission rate of vertical component is 71.25%, the reflection rate of parallel component is 0, and the transmission rate of parallel component is 100%, with no reflection loss; a portion of vertical component and all parallel component enters Brewster axial cone 60. Because Yb:YAG laser crystal and YAG crystal have the same indexes of refraction in value, both are 1.82, therefore the above-mentioned photons can pass through surfaces S3 and S2 and propagate along lines to surface S1 of the laser gain medium 50. Because S1 is coated with a coating highly reflective at 1030 nm, photons with a portion of vertical component and all parallel component will be totally reflected from the bottom surface S1 and propagate along lines to conical surface S4 of the laser gain medium 50, and parallel emitted from conical surface S4 at Brewster's angle. Photons are incident to YAG crystal from air at Brewster's angle, and photons are incident to air from YAG crystal at Brewster's angle, this phenomenon could be deemed as reversible optical path, i.e. the angle of incidence and the angle of refraction are interchanged, and according to the equations (1), (2), (3), and (4), there are still 28.75% of vertical component photons being reflected from interface S4 between Brewster axial cone 60 and the air, and entering the Brewster axial cone 60, and then being lost; and a portion of vertical component photons and all parallel component photons are refracted into the air from the interface S4 at Brewster's angle, and these photons propagate along lines in the air to the plane output lens; photons from plane output lens→conical surface 54 of the axial cone→thin disk surface S1→conical surface S4 of the axial cone→plane output lens, therefore to complete one time of oscillation, and in this closed oscillation, photons have two opportunities to have reflection and refraction from surface S4 (both related to Brewster's angle), and the vertical component photons are lost in this two reflections, and parallel component photons enter Brewster axial cone 60 or the air by refraction with no loss. In short, each time when photons oscillate between surface S1 of the laser gain medium 50 and output lens 70, photons pass conical surface S4 of the laser gain medium 50 twice, and the conical surface S4 will lead to the loss of a portion of vertical component by refection, and the remaining vertical component photons and all parallel component photons will be transmitted with no loss. By multiple oscillations, finally all the vertical component photons will be lost and parallel component photons will be transited through Brewster axial cone 60, so that vertical component photons will be restrained and the parallel component photons oscillating between surface S1 and plane output lens 70 are screened out. The oscillating parallel photons pass the pumping area 52 twice in each time of oscillation, so that the number of photons is increased, and when the gain of the number of photons is more than the loss in the cavity, due to the special geometric symmetry of axial cone, radial polarized laser beam 90 is output from the laser harmonic oscillator cavity.

In order to improve the heat lens effect of the laser gain medium 50 of this radial polarization laser, it is necessary to dissipate the large amount of heat generated when 940 nm LD laser pumping the laser gain medium 50. Because YAG crystal is a good conductor of heat, therefore by bonding the Brewster axial cone with Yb:YAG thin disk, the heat effect of laser gain medium 50 can be effectively improved.

Further, in this embodiment, in order to effectively protect the laser gain medium 50, Brewster axial cone 60 and to improve the heat lens effect of laser gain medium 50, a dissipation device could be provided on the pumping side of laser gain medium 50, to cool the large amount of heat generated by laser gain medium 50 through water-cooling by the dissipation device.

Figure 18:
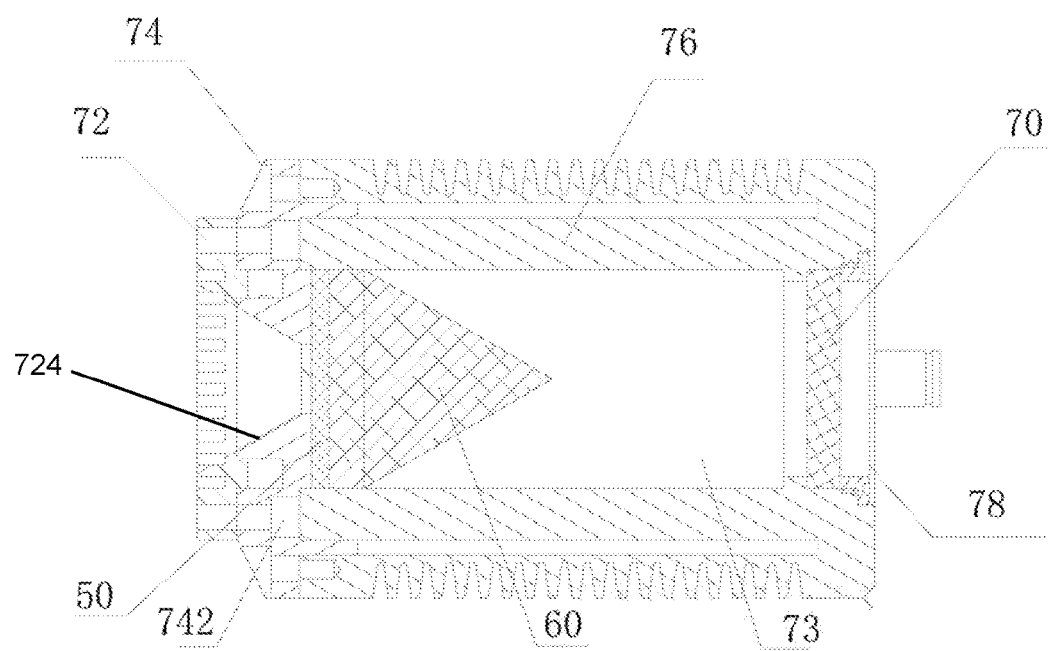
FIG. 18 is a cross-sectional view of the cooling device for the laser gain medium.
Figure 19:
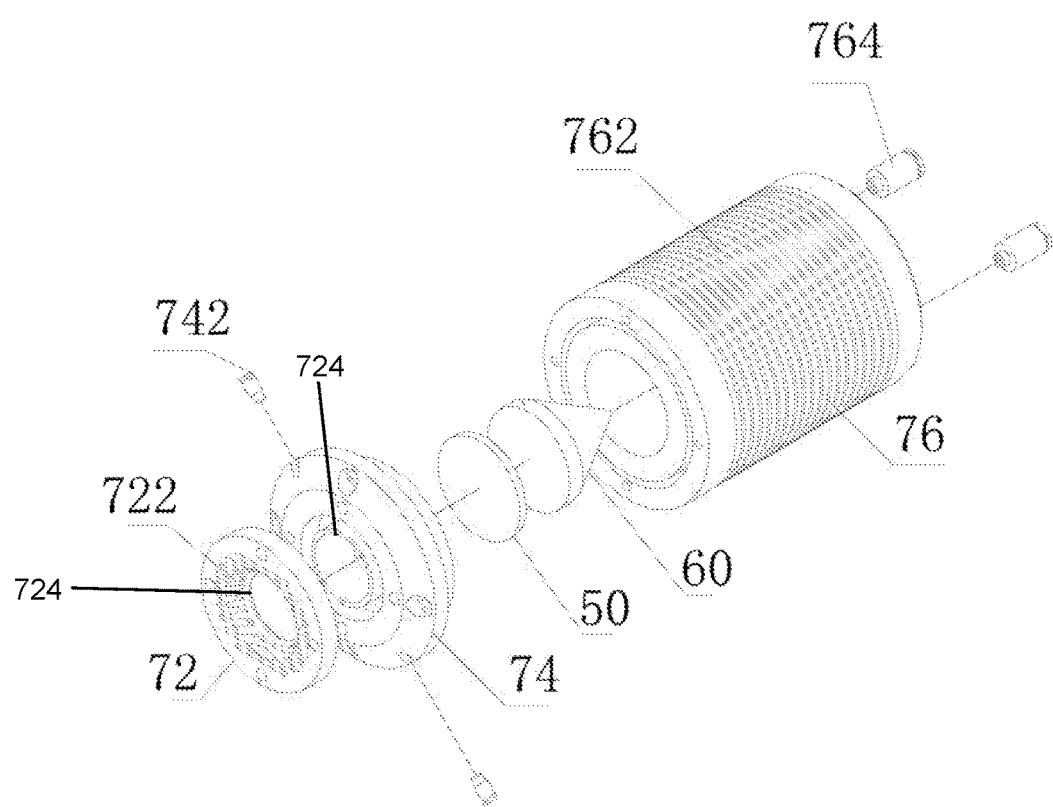
FIG. 19 is a perspective exploded view of the cooling device for the laser gain medium.

Referring to FIG. 18 and FIG. 19, according to this embodiment, the radial polarization disk laser 100 further includes a dissipation device 72, a second sealing cover 74, and an output lens barrel 76. The second sealing cover 74 is shaped substantially as annular, and coolant circulation system 742 is provided inside. The dissipation device is fixed to a side of the second sealing cover 74 by screw. The dissipation device 72 is made of copper, whose surface is provided with multiple heat: conductive slots 722 to increase the surface of dissipation, and increase cooling efficiency. The output lens barrel 76 is substantially a hollow cylinder, whose surface is provided with a series of fins 762. One end of the output lens barrel 76 and the second sealing cover 74 cooperatively forms an output lens chamber 73. The laser gain medium 50 and the Brewster axial cone 60 are fixed to one end of the output lens chamber 73. Both the dissipation device 72 and the second sealing cover 74 are provided with taper holes 724 pointing towards laser gain medium 50, so as to help the focusing lens 30 better to focus the pumping energy onto the laser gain medium 50. The output lens 70 is fixed to the other end of output barrel 76 by pressure ring 78. The other end of the output barrel 76 is also provided with coolant circulation system 764.

It is understood that, all the angles mentioned in this description, including the angle of incidence $\theta_i=32.4268°$, Brewster's angle $\theta_B=61.2134'$, can have ±2'of tolerance.

All the above-mentioned embodiments only show a few ways to implement this invention; and the description is specific and detailed, but it should not be deemed as a limitation of this invention herein. It should be noted that one skilled in the art, without departing from the concept of the present invention, can also make a number of modifications and improvements, which are part of the scope of the present invention. Accordingly, the scope of protection of the present invention should be based on the appended claims.

What is claimed is:

1. A radial polarization disk laser, comprising:
a pumping source, a collimator lens, a focusing lens, a laser gain medium, a Brewster axial cone, and a output lens, which are sequentially arranged along a laser light path, wherein an angle formed between a conical surface and a bottom surface of said Brewster axial cone is a Brewster's angle;
said laser gain medium is bonded with said bottom surface;
said laser gain medium and said output lens form a laser harmonic oscillator cavity therebetween;
wherein pumped laser light emitted by said pumping source passes through said collimator lens and said focusing lens, is then focused on the laser gain medium, and generated photons oscillate in said laser harmonic oscillator cavity, and then a radially polarized laser beam is finally output by said output lens;
wherein the laser gain medium is Yb:YAG disk with a doping concentration of 5.0 at % to 15 at %, and the Yb:YAG disk has a thickness of 0.2 to 0.5 mm; and
wherein the laser further comprises a concave reflector group, disposed at a side of the laser gain medium away from said Brewster axial cone; wherein the pumped laser light not absorbed by the laser gain medium is reflected by said concave reflector group, and then reenters said laser gain medium.

2. The radial polarization disk laser of claim 1, wherein said Brewster axial cone includes a base and a taper attached to said base, said laser gain medium is bonded with said base, and a thickness of said base is twice of the thickness of said Yb:YAG disk.

3. The radial polarization disk laser of claim 2, wherein said Brewster axial cone is made of YAG crystal, and said Brewster's angle is 61.2134°±2'.

4. The radial polarization disk laser of claim 2, wherein said Brewster axial cone is made of quartz, and said Brewster's angle is 55.4°±2'.

5. The radial polarization disk laser of claim 1, further comprising a heat dissipating device, a second sealing cover, and an output lens barrel;
wherein said second sealing cover and said output lens barrel cooperatively form an output lens chamber to accommodate said laser gain medium and said Brewster axial cone;
said heat dissipating device is provided on a side of said second sealing cover, said output lens is provided on one end of said output lens barrel, said output lens barrel is provided with a coolant circulation system.

6. The radial polarization disk laser of claim 5, wherein both said heat dissipating device and said second sealing cover are provided with taper holes pointing towards said laser gain medium.

7. The radial polarization disk laser of claim 1, wherein the pumped laser light emitted by said pumping source has a wavelength of 940 nm.

8. The radial polarization disk laser of claim 1, wherein said radially polarized laser beam has a wavelength of 1030 nm.

9. A radial polarization disk laser, comprising:
a pumping source, a collimator lens, a focusing lens, a laser gain medium, a Brewster axial cone, and a output lens, which are sequentially arranged along a laser light path, wherein an angle formed between a conical surface and a bottom surface of said Brewster axial cone is a Brewster's angle;
said laser gain medium is bonded with said bottom surface;
said laser gain medium and said output lens form a laser harmonic oscillator cavity therebetween;
wherein pumped laser light emitted by said pumping source passes through said collimator lens and said focusing lens, is then focused on the laser gain medium, and generated photons oscillate in said laser harmonic oscillator cavity, and then a radially polarized laser beam is finally output by said output lens, and
wherein the laser further comprises a concave reflector group disposed at a side of the laser gain medium away from said Brewster axial cone; wherein the pumped laser light not absorbed by the laser gain medium is reflected by said concave reflector group, and then reenters said laser gain medium.

10. The radial polarization disk laser of claim 9, wherein said concave reflector group comprises seven inner reflectors and eight outer reflectors, said seven inner reflectors and said focusing lens are arranged to form an inner ring which is symmetrical in respect to an axis of said Brewster axial cone; and said eight outer reflectors are arranged to form an outer ring surrounding the inner ring.

11. The radial polarization disk laser of claim 9, further comprising a lens holder, a pump head, and a first sealing cover;
wherein said pump head and said first sealing cover cooperatively form a pumping chamber to accommodate said lens holder;
said concave reflector group is fixed to said lens holder; and
in the first sealing cover is provided with a coolant circulation system therein.

12. A radial polarization disk laser, comprising:
a pumping source, a collimator lens, a focusing lens, a laser gain medium, a Brewster axial cone, and a output lens, which are sequentially arranged along a laser light path, wherein an angle formed between a conical surface and a bottom surface of said Brewster axial cone is a Brewster's angle;
said laser gain medium is bonded with said bottom surface;
said laser gain medium and said output lens form a laser harmonic oscillator cavity therebetween;
wherein pumped laser light emitted by said pumping source passes through said collimator lens and said focusing lens, is then focused on the laser gain medium, and generated photons oscillate in said laser harmonic oscillator cavity, and then a radially polarized laser beam is finally output by said output lens;

wherein the laser gain medium is Yb:YAG disk with a doping concentration of 5.0 at % to 15 at %, and the Yb:YAG disk has a thickness of 0.2 to 0.5 mm; and wherein one surface of said laser gain medium away from the Brewster axial cone is provided with a first two-wavelength coating, which is highly transmissive in respect to incident light and highly reflective in respect to emergent light; and the other surface of said gain medium close to the Brewster axial cone is provided with a second two-wavelength coating, which is highly reflective in respect to incident light and highly transmissive in respect to emergent light.

13. The radial polarization disk laser of claim 12, wherein the bottom surface and the conical surface of said Brewster axial cone are both provided with a coating highly transmissive in respect to emergent light.

* * * * *